(12) United States Patent
Xia et al.

(10) Patent No.: US 10,804,597 B2
(45) Date of Patent: Oct. 13, 2020

(54) ANTENNA SYSTEM AND COMMUNICATION TERMINAL

(71) Applicant: AAC Technologies Pte. Ltd., Singapore (SG)

(72) Inventors: Xiaoyue Xia, Shenzhen (CN); Chao Wang, Shenzhen (CN)

(73) Assignee: AAC Technologies Pte. Ltd., Singapore (SG)

(*) Notice: Subject to any disclaimer, the term of this patent is extended or adjusted under 35 U.S.C. 154(b) by 143 days.

(21) Appl. No.: 16/236,512

(22) Filed: Dec. 30, 2018

(65) Prior Publication Data
US 2019/0229404 A1 Jul. 25, 2019

(30) Foreign Application Priority Data
Jan. 25, 2018 (CN) .......................... 2018 1 0070583

(51) Int. Cl.
| | |
|---|---|
| *H01Q 21/22* | (2006.01) |
| *H01Q 1/24* | (2006.01) |
| *H01Q 1/38* | (2006.01) |
| *H04M 1/02* | (2006.01) |
| *H01Q 21/06* | (2006.01) |
| *H01Q 3/36* | (2006.01) |
| *H01Q 1/22* | (2006.01) |

(Continued)

(52) U.S. Cl.
CPC .......... *H01Q 1/243* (2013.01); *H01Q 1/2283* (2013.01); *H01Q 1/24* (2013.01); *H01Q 1/38* (2013.01); *H01Q 3/36* (2013.01); *H01Q 21/065* (2013.01); *H01Q 21/08* (2013.01); *H01Q 21/205* (2013.01); *H01Q 21/22* (2013.01); *H01Q 21/293* (2013.01); *H04M 1/0266* (2013.01); *H04M 1/0283* (2013.01); *H01Q 1/48* (2013.01)

(58) Field of Classification Search
CPC ...... H01Q 1/243; H01Q 21/22; H01Q 21/065; H01Q 3/36; H01Q 1/38; H01Q 1/2283; H01Q 21/08; H01Q 21/205; H01Q 21/293; H01Q 1/24; H04M 1/0283; H04M 1/0266
USPC ........................................................ 343/893
See application file for complete search history.

(56) References Cited

U.S. PATENT DOCUMENTS

| | | | |
|---|---|---|---|
| 2013/0342411 A1* | 12/2013 | Jung ..................... | H01Q 5/307 343/767 |
| 2014/0354486 A1* | 12/2014 | Flores-Cuadras ...... | H05K 1/117 343/700 MS |

(Continued)

*Primary Examiner* — Hai V Tran
(74) *Attorney, Agent, or Firm* — IPro, PLLC; Na Xu (57) ABSTRACT

The present disclosure provides an antenna system, including a circuit board and three antenna arrays. The circuit board includes a circuit chip and a first PCB, a first FPC, a second PCB, a second FPC, and a third PCB that are sequentially stacked and electrically connected to each other. The first FPC includes a first extension portion, the second FPC includes a second extension portion and a third extension portion on two adjacent sides, the first extension portion and the second extension portion are located on a same side of the circuit board, and every two of the first extension portion, the second extension portion, and the third extension portion are perpendicular to each other. The present invention further provides a communication terminal using the antenna system. The antenna system and the communication terminal of the present disclosure have a wide frequency band, high coverage efficiency, and a stable signal.

9 Claims, 5 Drawing Sheets (51) Int. Cl.
*H01Q 21/20* (2006.01)
*H01Q 21/29* (2006.01)
*H01Q 21/08* (2006.01)
*H01Q 1/48* (2006.01)

(56) References Cited

U.S. PATENT DOCUMENTS

2015/0070856 A1* 3/2015 Wada .................. H05K 1/0281
                                                         361/749
2016/0072189 A1* 3/2016 Lo Hine Tong ....... H01Q 1/243
                                                         343/845
2018/0176435 A1* 6/2018 Wei ........................ H05K 1/028
2019/0229399 A1* 7/2019 Wang .................... H01Q 21/22
2019/0229405 A1* 7/2019 Xia ...................... H01Q 21/205

\* cited by examiner

ANTENNA SYSTEM AND COMMUNICATION TERMINAL

CROSS-REFERENCE TO RELATED APPLICATIONS

This application claims the priority benefit of Chinese Patent Applications Ser. No. 201810070583.3 filed on Jan. 25, 2018, the entire content of which is incorporated herein by reference.

TECHNICAL FIELD

The present disclosure relates to an antenna, and in particular, to an antenna system and a communication terminal that are applied to communication electronic products.

BACKGROUND

With the development of mobile communication technologies, mobile phones, PADs, notebook computers, and the like have gradually become important electronic products in life, and such electronic products have been updated to include an antenna system and therefore become electronic communication products having a communication function.

As the focus of research and development in the global industry, 5G has three main application scenarios: enhanced mobile broadband, large-scale machine communication, and high-reliability and low-latency communication. The three application scenarios respectively correspond to different key indicators, where a user peak velocity in the enhanced mobile broadband scenario is 20 Gbps, and a minimum user experience rate is 100 Mbps. A high carrier frequency and large bandwidth characteristic unique to millimeter waves is a main means to achieve a 5G ultra-high data transmission rate. Therefore, rich bandwidth resources of a millimeter wave frequency band provide a guarantee for the high-speed transmission rate.

However, due to severe spatial loss of electromagnetic waves in the millimeter wave frequency band, a wireless communication system using the millimeter wave frequency band needs to use a phased array architecture. Phases of array elements are distributed according to a particular rule by using a phase shifter, so that a high-gain beam is formed, and the beam is enabled, through a phase shift change, to scan within a particular space.

A mobile terminal structure using 3D glass is the mainstream in the future, because the 3D glass has characteristics such as a light and thin design, fingerprint resistance, weather resistance, and excellent touch feeling, and has excellent physical performance for technologies such as wireless charging and 5G millimeter wave antennas.

Therefore, it is necessary to provide a new antenna system and a communication terminal to resolve foregoing problems.

BRIEF DESCRIPTION OF THE DRAWINGS

To illustrate the technical solutions in the embodiments of the present disclosure more clearly, the following briefly describes the accompanying drawings required for describing the embodiments. Apparently, the accompanying drawings in the following descriptions merely show some embodiments of the present disclosure, and persons of ordinary skill in the art can derive other drawings from these accompanying drawings without creative efforts.

FIGS. 3a1, 3a2, 3b1, 3b2, 3c1 and 3c2 are directivity patterns of a scanning coverage of an antenna array of a communication terminal according to the present disclosure;

DETAILED DESCRIPTION

The technical solutions of the embodiments of the present disclosure are illustrated clearly and completely in the following with reference to the accompanying drawings in the embodiments of the present disclosure. Apparently, the illustrated embodiments are only some embodiments of the present disclosure, rather than all embodiments. On the basis of the embodiments of the present disclosure, all other embodiments obtained by the person of ordinary skill in the art without creative efforts shall fall within the protection scope of the present disclosure.

Figure 1:
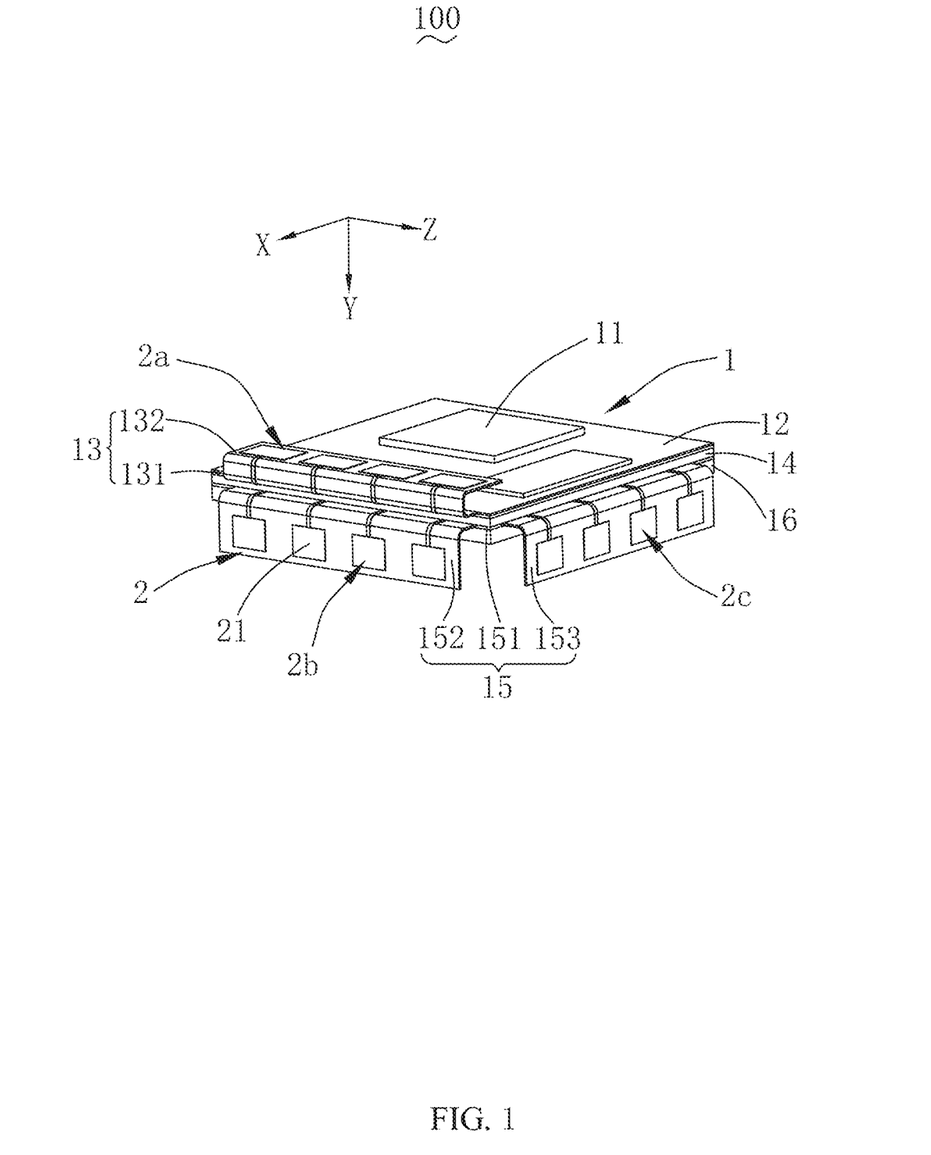
FIG. 1 is a three-dimensional schematic structural diagram of an antenna system according to the present disclosure.

FIG. 1 is a three-dimensional schematic structural diagram of an antenna system according to the present disclosure. The present invention provides an antenna system 100, including a circuit board 1 and at least three antenna arrays 2 separately fixed on the circuit board 1.

The circuit board 1 includes a circuit chip 11 and a first PCB 12 (first printed circuit board 12), a first FPC 13 (first flexible printed circuit board 13), a second PCB 14 (second printed circuit board 14), a second FPC 15 (second flexible printed circuit board 15), and a third PCB 16 (third printed circuit board 16) that are sequentially stacked and electrically connected to each other.

The circuit chip 11 is fixed and electrically connected to the first PCB 12.

In this embodiment, the circuit chip 11 includes a radio frequency integrated chip RFIC and an integrated circuit that implements other circuit function, for example, a phased array feeding network.

The first FPC 13 includes a first body portion 131 disposed between the first PCB 12 and the second PCB 14 and a first extension portion 132 that reversely extends from the first body portion 131 in a bent manner and that is parallel to the first body portion 131.

The second FPC 15 includes a second body portion 151 disposed between the second PCB 14 and the third PCB 16 and a second extension portion 152 and a third extension portion 153 that perpendicularly extend toward a direction of the third PCB 16 respectively from two adjacent sides of the second body portion 151.

The first extension portion 132 and the second extension portion 152 are located on a same side of the circuit board 1, and every two of the first extension portion 132, the second extension portion 152, and the third extension portion 153 are perpendicular to each other.

There are three antenna arrays 2, i.e., a first antenna array 2a, a second antenna array 2b, and a third antenna array 2c.

Each antenna array 2 includes a plurality of antenna units 21 disposed in an array. In this embodiment, each antenna array 2 includes four antenna units 21 arranged in a linear array. More preferably, the antenna unit 21 is a millimeter wave antenna.

In this embodiment, the three antenna arrays 2 are respectively attached to the first extension portion 132, the second extension portion 152, and the third extension portion 153, and are arranged along respective length directions.

To be specific, the first antenna array 2a is attached to the first extension portion 132 and is arranged along the length direction of the first extension portion 132; the second antenna array 2b is attached to the second extension portion 152 and is arranged along the length direction of the second extension portion 152; and the third antenna array 2c is attached to the third extension portion 153 and is arranged along the length direction of the third extension portion 153.

In the foregoing structure, a structure of a plurality of millimeter wave antennas is manufactured by using a plurality of FPC layers. The first extension portion 132, the second extension portion 152, and the third extension portion 153 are bent towards different directions, to implement coverage of the antenna system 100 on different spatial directions, that is, achieve a full coverage effect of wide coverage.

For example, as shown in the figure, space is divided into three dimensions: X, Y, and Z, but the antenna system 100 can implement coverage on the three directions by using a structure in which every two of the three antenna arrays 2 are perpendicular to each other.

For example, assuming that the circuit board 1 in FIG. 1 is rectangular, a three-dimensional coordinate system of X, Y, and Z axes in FIG. 1 is established. The first extension portion 132 and the second extension portion 152 are located on a same side of the circuit board 1 and are bent in directions perpendicular to each other. The second extension portion 152 and the third extension portion 153 are located on a structure of a same FPC layer but are located on two adjacent sides of the circuit board 1, and they are perpendicular to each other.

That is, specifically, the second antenna array 2b and the third antenna array 2c are on a structure of a same FPC layer, but are located on two adjacent side edges of the circuit board 1. The first antenna array 2a and the second antenna array 2b are located on a same side edge of the circuit board 1 but are located on two different FPC layers (respectively located on the first FPC 13 and the second FPC 15). The first antenna array 2a is bent upward, so that an array surface thereof faces a Y-axis negative direction, and the second antenna array 2b and the third antenna array 2c are bent downward, so that array surfaces thereof respectively face an X-axis positive direction and a Z-axis positive direction. In this way, the first antenna array 2a, the second antenna array 2b, and the third antenna array 2c respectively scan and radiate in spaces of three directions: the Y-axis negative direction, the X-axis positive direction, and the Z-axis positive direction.

More preferably, in this embodiment, the three antenna arrays 2 are respectively formed on the first extension portion 132, the second extension portion 152, and the third extension portion 153 in a printed manner. The structure formed in a printed manner has higher flexibility, and does not easily fail due to a structure break, and therefore has higher reliability.

Figure 2:
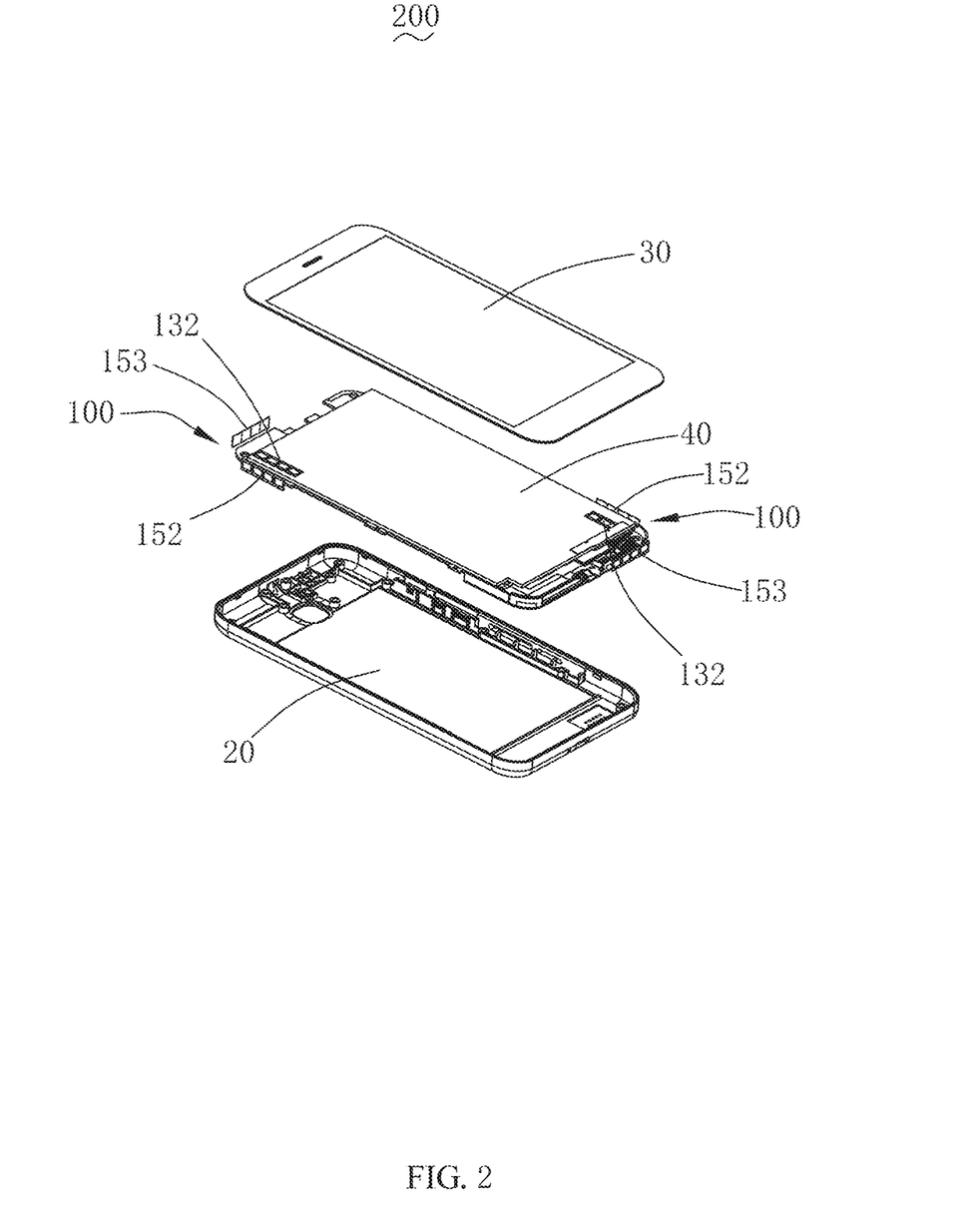
FIG. 2 is a schematic structural diagram of a communication terminal according to the present disclosure.
Figure 3A:
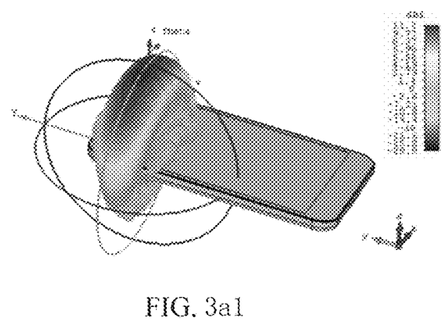
Figure 3A:
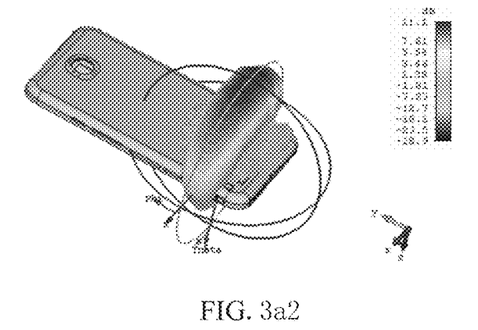
Figure 3B:
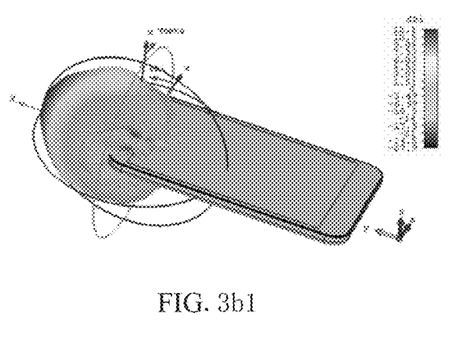
Figure 3B:
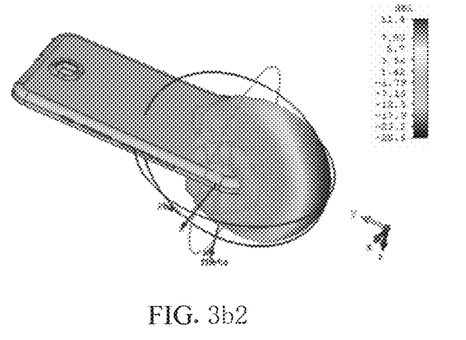
Figure 3C:
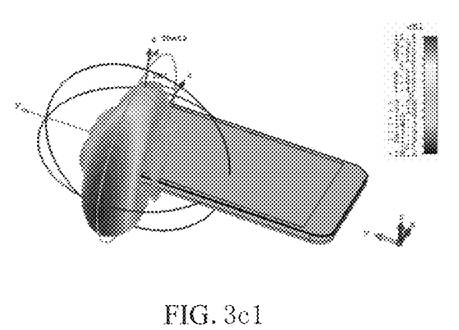
Figure 3C:
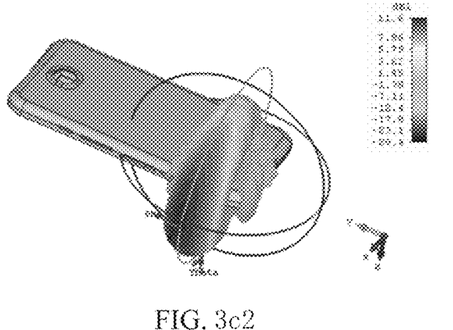

FIG. 2 is a schematic structural diagram of a communication terminal according to the present disclosure. The present invention further provides a communication terminal 200, including a housing 20, a display screen 30 assembled on the housing 20 and enclosing an accommodating space, a main board 40 accommodated in the accommodating space, and the antenna system 100. More preferably, the housing 20 and the display screen 30 are both made of 3D glass, and the structure can effectively reduce radiation blockage on the antenna system 100, and has higher radiation efficiency.

The communication terminal 200 may be a mobile phone, an IPAD, or the like, and is described by using a mobile phone as an example. The communication terminal 200 forms a phased array structure by using the antenna system 100 in a manufacturing form of a rigid-flexible board.

The circuit board 1 is electrically connected to the main board 40, and the circuit board 1 is integrated with the main board 40.

In this embodiment, there are two antenna systems 100, which are respectively disposed on the inner side of the housing 20 and the inner side of the display screen 30 of the communication terminal 200, and the two antenna systems 100 are located on two opposite ends on different sides of the communication terminal 200. That is, the two antenna systems 100 are respectively located on the two opposite ends on a front surface side and a rear surface side of the communication terminal 200.

The inner side of the display screen 30 refers to the side of the display screen 30 close to the main board 40, and the inner side of the housing 20 refers to the side of the housing 20 close to the main board 40.

The first extension portion 132, the second extension portion 152, and the third extension portion 153 of each antenna system 100 are respectively attached to inner sides of the housing 20 and the display screen 30, that is, the sides close to the main board 40.

The antenna system 100 for radiation is placed on the first FPC 13 and the second FPC 15, the phased array feeding network is placed on the first PCB 12, and space between the housing 20 and the display screen 30 that are made of 3D glass is fully used. Specifically, the two antenna systems 100 are respectively disposed between the display screen 30 and the main board 40 and between the housing 20 and the main board 40. The structure of one PCB layer in the antenna system 100 may be integrated with the main board 40, for example, the third PCB 16.

The structure enables the antenna array 2 not to occupy the surface area of the first PCB 12.

In the communication terminal of the present disclosure, the first FPC 13 and the second FPC 15 of the antenna system 100 may be placed on a side edge of the communication terminal 200 by using flexibility of FPCs, to avoid an effect of large blocks of metal grounds on antenna radiation performance. Alternatively, the first FPC 13 and the second FPC 15 may be placed on inner surfaces of the housing 20 and the display screen 30, and this is practical.

The antenna array 2 that uses a flexible circuit board structure as a carrier is used, so that close attachment to 3D glass can be implemented, and the antenna array 2 has no performance loss compared with a radiation antenna in a free space, and directivity pattern distortion generated due to air existing between the 3D glass and the antenna array 2 is also avoided.

FIGS. 3a1, 3a2, 3b1, 3b2, 3c1 and 3c2 are directivity patterns of a scanning coverage of an antenna array of a communication terminal according to the present disclosure. It can be seen that, the communication terminal 200 achieves a full space coverage effect by using the two antenna systems 100. FIG. 3a1, FIG. 3b1, and FIG. 3c1 are directivity patterns of three directivity surfaces (a front surface, a left surface, and an upper surface of the communication terminal) of the antenna array 2 of the antenna system 100 on a front end of the communication terminal. FIG. 3a2, FIG. 3b2, and FIG. 3c2 are directivity patterns of three directivity surfaces (a back surface, a right surface, and a lower surface of the communication terminal) of the antenna array 2 of the antenna system 100 on a rear end of the communication terminal. That is, full space coverage is implemented.

Figure 4:
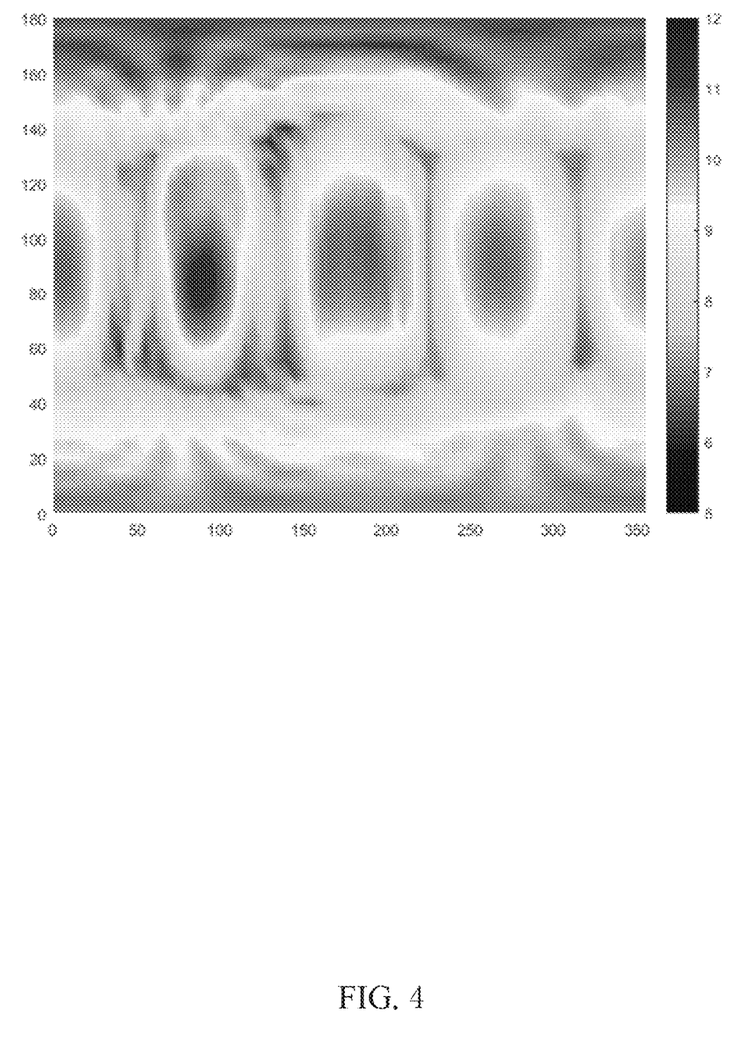
FIG. 4 is an effect diagram of an overall scanning mode of two antenna systems of a communication terminal according to the present disclosure.
Figure 5:
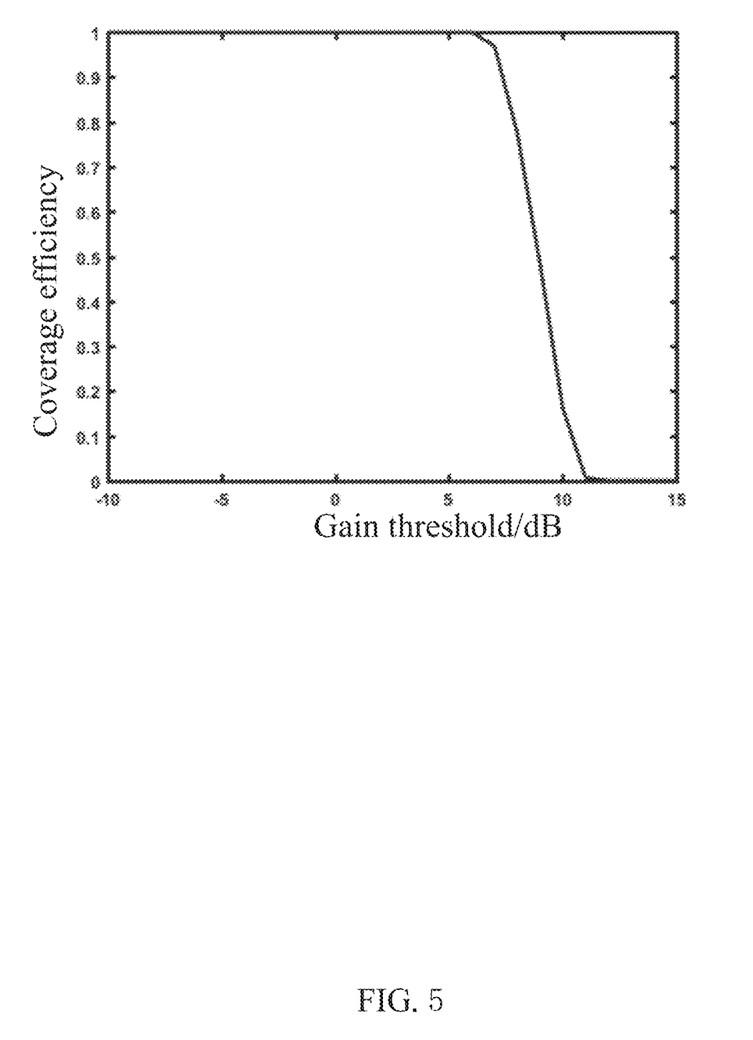
FIG. 5 is a curve diagram of frequency coverage efficiency of a communication terminal according to the present disclosure.

FIG. 4 is an effect diagram of an overall scanning manner of two antenna systems of a communication terminal according to the present disclosure. FIG. 5 is a curve diagram of frequency coverage efficiency of a communication terminal according to the present disclosure. It can be seen that, frequency coverage efficiency of the communication terminal 100 using the antenna system 100 is high.

Due to the flexibility attribute of the flexible printed circuit board, and close attachment to 3D glass, the antenna system 100 has higher mechanical stability, and is not damaged, does not fail, or does not deteriorate in performance due to reasons such as drop or vibration, and has higher reliability.

Compared with the existing art, the antenna system of the present disclosure includes three antenna arrays respectively fixed on FPCs, so as to form three independent FPC antenna array structures, and the FPCs are flexibly bent to make the three antenna arrays to form phased array structures with every two of them being perpendicular to each other, to implement coverage of the antenna system on different spatial directions, thereby managing spatial coverage of the antenna system more flexibly, implementing full-range coverage, and achieving high stability. In the communication terminal using the antenna system, the circuit board of the antenna system is integrated with the main board; the first extension portion, the second extension portion, and the third extension portion are respectively attached to the housing and the display screen, so that antenna radiation performance is implemented by fully using space between the display screen and the main board and space between the housing and the main board, thereby achieving good performance and avoiding directivity pattern distortion. The antenna arrays are disposed on the first FPC and the second FPC, and the flexibility attribute of the first FPC and the second FPC is fully used, so that the antenna system is not damaged, does not fail, or does not deteriorate in performance due to reasons such as drop or vibration. In this way, communication performance and reliability of the communication terminal are strong.

Compared with related technologies, the antenna system of the present disclosure includes three antenna arrays respectively fixed on FPCs, so as to form three independent FPC antenna array structures, and the FPCs are flexibly bent to make the three antenna arrays to form phased array structures with every two of them being perpendicular to each other, to implement coverage of the antenna system on different spatial directions, thereby managing spatial coverage of the antenna system more flexibly, implementing full-range coverage, and achieving high stability. In the communication terminal using the antenna system, the circuit board of the antenna system is integrated with the main board; the first extension portion, the second extension portion, and the third extension portion are respectively attached to the housing and the display screen, so that antenna radiation performance is implemented by fully using space between the display screen and the main board and space between the housing and the main board, thereby achieving good performance and avoiding directivity pattern distortion. The antenna arrays are disposed on the first FPC and the second FPC, and the flexibility attribute of the first FPC and the second FPC is fully used, so that the antenna system is not damaged, does not fail, or does not deteriorate in performance due to reasons such as drop or vibration. In this way, communication performance and reliability of the communication terminal are strong.

The foregoing descriptions are merely embodiments of the present disclosure, and the protection scope of the present disclosure is not limited thereto. All equivalent structures or process changes made according to the content of this specification and accompanying drawings in the present disclosure or by directly or indirectly applying the present disclosure in other related technical fields shall fall within the protection scope of the present disclosure.

What is claimed is:

1. An antenna system, comprising
a circuit board and
at least three antenna arrays separately fixed on the circuit board; wherein
each antenna array comprises a plurality of antenna units disposed in an array;
the circuit board comprises a circuit chip and a first PCB, a first FPC, a second PCB, a second FPC, and a third PCB that are sequentially stacked and electrically connected to each other;
the circuit chip is fixed and electrically connected to the first PCB;
the first FPC comprises a first body portion disposed between the first PCB and the second PCB and a first extension portion that is reversely bent and extends from the first body portion and that is parallel to the first body portion;
the second FPC comprises a second body portion disposed between the second PCB and the third PCB and a second extension portion and a third extension portion that perpendicularly extend toward a direction of the third PCB respectively from two adjacent sides of the second body portion; the first extension portion and the second extension portion are located on a same side of the circuit board, and every two of the first extension portion, the second extension portion, and the third extension portion are perpendicular to each other; and
the three antenna arrays are respectively attached to the first extension portion, the second extension portion, and the third extension portion, and are arranged along respective length directions.

2. The antenna system according to claim 1, wherein each antenna array comprises four antenna units arranged in a linear array.

3. The antenna system according to claim 2, wherein the antenna unit is a millimeter wave antenna.

4. The antenna system according to claim 1, wherein the three antenna arrays are respectively formed on the first extension portion, the second extension portion, and the third extension portion in a printed manner.

5. The antenna system according to claim 1, wherein the circuit chip comprises an RFIC.

6. A communication terminal, comprising
a housing,
a display screen assembled on the housing and enclosing an accommodating space, and
a main board accommodated in the accommodating space;
wherein the communication terminal comprises the antenna system according to claim 1, and the circuit board is electrically connected to the main board.

7. The communication terminal according to claim 6, wherein the housing and the display screen are both made of 3D glass.

8. The communication terminal according to claim 6, wherein the first extension portion, the second extension portion, and the third extension portion are respectively attached to inner sides of the housing and the display screen.

9. The communication terminal according to claim 8, wherein the communication terminal comprises two antenna systems respectively disposed on the inner side of the housing and the inner side of the display screen, and the two antenna systems are located on two opposite ends on different sides of the communication terminal.

\* \* \* \* \*